(12) United States Patent
Matsushiro

(10) Patent No.: US 9,290,140 B2
(45) Date of Patent: Mar. 22, 2016

(54) VEHICLE END SECTION STRUCTURE

(71) Applicant: TOYOTA JIDOSHA KABUSHIKI KAISHA, Toyota-shi (JP)

(72) Inventor: Masanori Matsushiro, Okazaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/651,969

(22) PCT Filed: Dec. 18, 2012

(86) PCT No.: PCT/JP2012/082818
§ 371 (c)(1),
(2) Date: Jun. 12, 2015

(87) PCT Pub. No.: WO2014/097398
PCT Pub. Date: Jun. 26, 2014

(65) Prior Publication Data
US 2015/0314743 A1 Nov. 5, 2015

(51) Int. Cl.
*B60R 19/34* (2006.01)
*B60R 19/02* (2006.01)

(52) U.S. Cl.
CPC ............... *B60R 19/34* (2013.01); *B60R 19/023* (2013.01)

(58) Field of Classification Search
CPC ............................. B60R 19/34; B60R 19/023
USPC ............................. 293/133, 132; 296/187.09
See application file for complete search history.

(56) References Cited

U.S. PATENT DOCUMENTS

| 4,830,417 A | * | 5/1989 | Bates | B60R 19/26 267/116 |
| 4,830,418 A | * | 5/1989 | Gest | B60R 19/26 248/636 |

(Continued)

FOREIGN PATENT DOCUMENTS

| JP | 2000 344029 | 12/2000 |
| JP | 2003 200798 | 7/2003 |

(Continued)

OTHER PUBLICATIONS

English Translation of Response to Written Opinion Issued in PCT/JP2012/082818 Filed Dec. 18, 2012 (Total 2 Pages).
International Search Report Issued Apr. 2, 2013 in PCT/JP2012/082818 Filed Dec. 18, 2012.

(Continued)

*Primary Examiner* — Pinel Romain
(74) *Attorney, Agent, or Firm* — Oblon, McClelland, Maier & Neustadt, L.L.P

(57) ABSTRACT

In a frontal vehicle collision, an orthogonal cross-section of a crash box, taken orthogonally to the vehicle front-rear direction, deforms into a hexagonal shape. Due to this deformation of the orthogonal cross-section, new ridge lines are formed at an upper face portion and a lower face portion, running from the vicinity of both end portions in a vehicle width direction of vehicle rear end portions to the vicinity of both end portions in the vehicle width direction of respective join portions S. The strength of the crash box in the vehicle front-rear direction increases due to the increased number of ridge lines in the vehicle front-rear direction (axial direction). Load generated during crushing of the crash box in the vehicle front-rear direction therefore increases, as a result of which the energy absorption amount of the crash box increases. Namely, the impact absorption performance of the crash box is improved.

3 Claims, 15 Drawing Sheets

(56) References Cited

U.S. PATENT DOCUMENTS

| | | | |
|---|---|---|---|
| 4,940,270 A * | 7/1990 | Yamazaki | B60R 19/18 293/110 |
| 5,005,887 A * | 4/1991 | Kelman | B60R 19/24 293/109 |
| 5,150,935 A * | 9/1992 | Glance | B60R 19/30 293/136 |
| 5,876,078 A * | 3/1999 | Miskech | B60R 19/18 293/132 |
| 7,073,831 B2 * | 7/2006 | Evans | B60R 19/34 293/102 |
| 2014/0333077 A1 * | 11/2014 | Kil | B60R 19/03 293/132 |

FOREIGN PATENT DOCUMENTS

| | | |
|---|---|---|
| JP | 2006 327463 | 12/2006 |
| JP | 2007 91048 | 4/2007 |
| JP | 2009 113675 | 5/2009 |
| JP | 2009 126182 | 6/2009 |
| JP | 2009 234377 | 10/2009 |
| JP | 2010 126067 | 6/2010 |
| WO | 2006 068008 | 6/2006 |
| WO | WO 2006/068008 A1 | 6/2006 |

OTHER PUBLICATIONS

Extended European Search Report issued Dec. 18, 2015 in Patent Application No. 12890540.3.

* cited by examiner

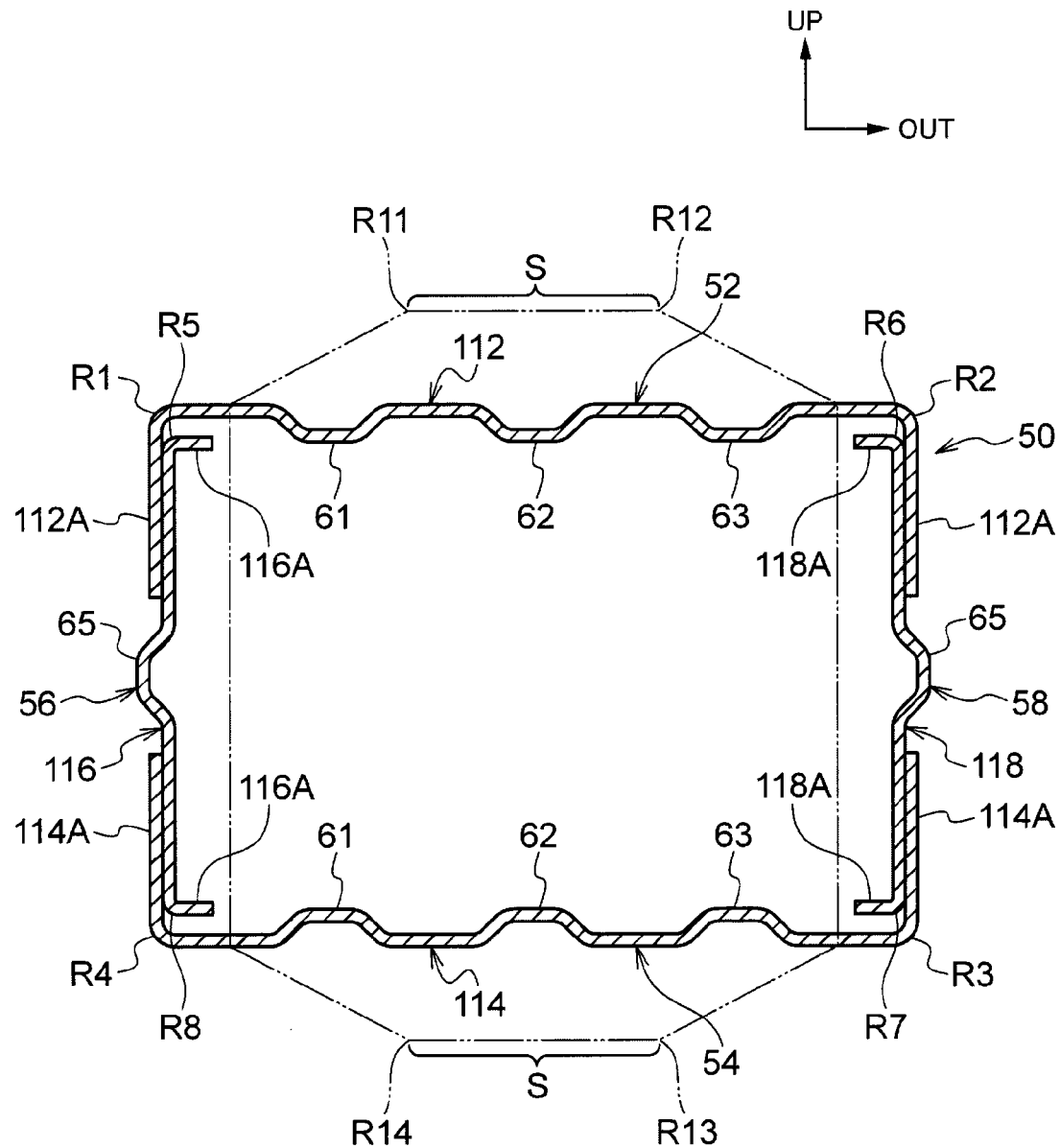

VEHICLE END SECTION STRUCTURE

TECHNICAL FIELD

The present invention relates to a vehicle end section structure.

BACKGROUND ART

Crash boxes have hitherto been provided between front end portions of side members and bumper reinforcement. In a vehicle collision, the crash box is crushed in the vehicle front-rear direction, thereby absorbing energy.

In Japanese Patent Application Laid-Open (JP-A) No. 2007-091048, technology is described such that a crash can (crash box) is formed with inward recessed beads extending in an up-down direction on left and right side faces and outward protruding beads extending in a vehicle width direction on upper and lower faces. In this crash can (crash box) of related technology, in a frontal collision or the like, the beads configure start points of buckling deformation and function as deformation start point portions when input with front-rear direction collision load of a specific value or above.

However, since the beads of the crash can (crash box) of related technology run along the vehicle up-down direction and the vehicle width direction, it is conceivable that any effect of increasing the load generated during vehicle front-rear direction crushing of the crash can (crash box) would be negligible. The related technology accordingly leaves room for improvement regarding improving impact absorption performance.

In JP-A No. 2009-113675, technology relating to a crash box is also described.

LIST OF PRIOR ART DOCUMENTS

Japanese Patent Application Laid-Open (JP-A) No. 2007-091048

JP-A No. 2009-113675

SUMMARY OF INVENTION

Technical Subject

In consideration of the above circumstances, an object of the present invention is to provide a vehicle end section structure enabling improved impact absorption performance.

Solution to Subject

A vehicle end section structure of a first aspect of the present invention includes: a bumper reinforcement disposed running along a vehicle width direction at an end section in a front-rear direction of a vehicle; framework members disposed running along the vehicle front-rear direction at lower portions on both sides in a vehicle width direction; an impact absorbing member that is provided between the bumper reinforcement and each framework member, and that is crushed in the vehicle front-rear direction by collision load input from the bumper reinforcement; an upper side extension portion that extends from an upper portion of the bumper reinforcement toward a side of the impact absorbing member, and that is joined to an end portion of an upper face portion of the impact absorbing member over a joint width narrower than a width of the end portion in the vehicle width direction of the upper face portion of the impact absorbing member; and a lower side extension portion that extends from a lower portion of the bumper reinforcement toward the side of the impact absorbing member, and that is joined to an end portion of a lower face portion of the impact absorbing member over a joint width narrower than a width of the end portion in the vehicle width direction of the lower face portion of the impact absorbing member. Moreover, an external profile of the impact absorbing member, in an orthogonal cross-section taken orthogonally to the vehicle front-rear direction, is a substantially rectangular shape, and at least a portion of respective side wall portions provided between the upper face portion and the lower face portion is configured by overlapping and joining together plural plate members. In the orthogonal cross-section, the impact absorbing member includes: an upper side plate portion configuring upper portions of the side wall portions, and configuring the upper face portion; a lower side plate portion configuring lower portions of the side wall portions, and configuring the lower face portion; side plate portions, each of which overlaps from either an inside or an outside with either one of the upper portions of the side wall portions and either one of the lower portions of the side wall portions respectively configured by the upper side plate portion and the lower side plate portion, and the side plate portions configure the side wall portions together with the upper side plate portion and the lower side plate portion; and flange portions that are formed by bending respective leading end portions on the upper face portion side and the lower face portion side of each of the side plate portions toward the inside, and that are in the vicinity of, or in contact with, the upper face portion or the lower face portion.

In the vehicle end section structure of the first aspect, the impact absorbing member is crushed in the vehicle front-rear direction by collision load input from the bumper reinforcement, thereby absorbing energy.

Note that during crushing of the impact absorbing member, the upper side extension portion and the lower side extension portion of the bumper reinforcement open out in an up-down direction, and the end portion of the upper face portion and the end portion of the lower face portion of the impact absorbing member that are joined to the upper side extension portion and the lower side extension portion also open out in the up-down direction together as a unit therewith.

When this occurs, since the respective joint widths are narrower than the width of the end portion of the upper face portion and the end portion of the lower face portion of the impact absorbing member, only the join locations of the end portion of the upper face portion and the end portion of the lower face portion open out in the up-down direction together as a unit with the upper side extension portion and the lower side extension portion of the bumper reinforcement. The orthogonal cross-sections of the upper face portion and the lower face portion of the impact absorbing member, taken orthogonally to the vehicle front-rear direction, accordingly deform into substantially trapezoidal shapes with an upper base and a lower base respectively formed by the join locations. Due to this deformation of the orthogonal cross-section, new ridge lines along the vehicle front-rear direction are newly formed at the upper face portion and the lower face portion of the impact absorbing member.

The strength of the impact absorbing member in the vehicle front-rear direction increases due to the new ridge lines newly formed in the vehicle front-rear direction (due to the increased number of ridge lines in the vehicle front-rear direction). Load generated during crushing of the impact absorbing member in the vehicle front-rear direction therefore increases, as a result of which the energy absorption amount of the impact absorbing member increases. Namely, the impact absorption performance of the impact absorbing member is improved. Further, the rigidity of the side wall portions is raised due to overlapping and joining together plural plate members at least at a portion of the side wall portions of the impact absorbing member. Each side wall portion is therefore not susceptible to out-of-plane deformation, and the upper face portion and the lower face portion open out relatively readily in the up-down direction. Accordingly, new ridge lines are readily newly formed at the upper face portion and the lower face portion of the impact absorbing member. Moreover, the flange portions that are in the vicinity of, or in contact with, the upper face portion or the lower face portion of the impact absorbing member prevent or suppress collapse of ridge lines at corner portions of the substantially rectangular shaped orthogonal cross-section of the impact absorbing member. Load is borne stably by the new ridge lines due to the impact absorbing member being crushed in the vehicle front-rear direction in a more desirable manner.

In a vehicle end section structure of a second aspect of the present invention, the end portion of the upper face portion of the impact absorbing member and the end portion of the lower face portion of the impact absorbing member are respectively joined by welding to the upper side extension portion and the lower side extension portion of the bumper reinforcement.

The vehicle end section structure of the second aspect reduces the number of components in comparison to a configuration in which the end portion of the upper face portion of the impact absorbing member and the end portion of the lower face portion of the impact absorbing member are respectively joined to the upper side extension portion and the lower side extension portion of the bumper reinforcement using a joining method other than welding (for example nuts and bolts).

In a vehicle end section structure of a third aspect of the present invention, a single bead, or two or more beads, are formed at the upper face portion and the lower face portion of the impact absorbing member, so as to run along the vehicle front-rear direction.

In the vehicle end section structure of the third aspect, the beads formed running along the vehicle front-rear direction at the upper face portion and the lower face portion of the impact absorbing member increase the strength of the impact absorbing member in the vehicle front-rear direction, thereby increasing the energy absorption amount of the impact absorbing member. Moreover, the new ridge lines are more definitively formed at the locations where the beads are not formed, where rigidity is relatively low compared to the locations where the beads are formed, during crushing of the impact absorbing member in the vehicle front-rear direction.

In a vehicle end section structure of a fourth aspect of the present invention, an external profile of the impact absorbing member, in an orthogonal cross-section taken orthogonally to the vehicle front-rear direction, is a substantially rectangular shape, and at least a portion of respective side wall portions provided between the upper face portion and the lower face portion is configured by overlapping and joining together plural plate members.

In the vehicle end section structure of the fourth aspect, the rigidity of the side wall portions is raised due to overlapping and joining together plural plate members at least at a portion of the side wall portions of the impact absorbing member. Each side wall portion is therefore not susceptible to out-of-plane deformation, and the upper face portion and the lower face portion open out relatively readily in the up-down direction. Accordingly, new ridge lines are readily newly formed at the upper face portion and the lower face portion of the impact absorbing member.

A vehicle end section structure of a fifth aspect of the present invention is the vehicle end section structure of the fourth aspect, wherein, in the orthogonal cross-section, the impact absorbing member includes: an upper side plate portion configuring upper portions of the side wall portions, and configuring the upper face portion; a lower side plate portion configuring lower portions of the side wall portions, and configuring the lower face portion; side plate portions, each of which overlaps from either an inside or an outside with either one of the upper portions of the side wall portions and either one of the lower portions of the side wall portions respectively configured by the upper side plate portion and the lower side plate portion, the side plate portions configure the side wall portions together with the upper side plate portion and the lower side plate portion; and flange portions that are formed by bending respective leading end portions on the upper face portion side and the lower face portion side of each of the side plate portions toward the inside, and that are in the vicinity of, or in contact with, the upper face portion or the lower face portion.

In the vehicle end section structure of the fifth aspect, the flange portions that are in the vicinity of, or in contact with, the upper face portion or the lower face portion of the impact absorbing member prevent or suppress collapse of ridge lines at corner portions of the substantially rectangular shaped orthogonal cross-section of the impact absorbing member. Load is borne stably by the new ridge lines due to the impact absorbing member being crushed in the vehicle front-rear direction in a more desirable manner.

Advantageous Effects of Invention

The vehicle end section structure of the first aspect enables improved impact absorption performance.

The vehicle end section structure of the second aspect enables a reduction in the number of components.

The vehicle end section structure of the third aspect enables new ridge lines to be more definitively formed at the upper face portion and the lower face portion of the impact absorbing member.

The vehicle end section structure of the fourth aspect enables new ridge lines to be more definitively formed at the upper face portion and the lower face portion of the impact absorbing member.

The vehicle end section structure of the fifth aspect enables load to be borne stably by the new ridge lines.

BRIEF DESCRIPTION OF DRAWINGS

FIG. 4 is a vertical cross-section of the crash box illustrated in FIG. 3, taken along the vehicle width direction.

DESCRIPTION OF EMBODIMENTS

Vehicle Front Section

Explanation follows regarding a vehicle front section applied with a vehicle end section structure according to an exemplary embodiment of the present invention. Note that in each of the drawings, the arrow UP indicates the vehicle up-down direction upper side, the arrow FR indicates the vehicle front-rear direction front side, and the arrow OUT indicates a vehicle width direction outside.

Figure 1:
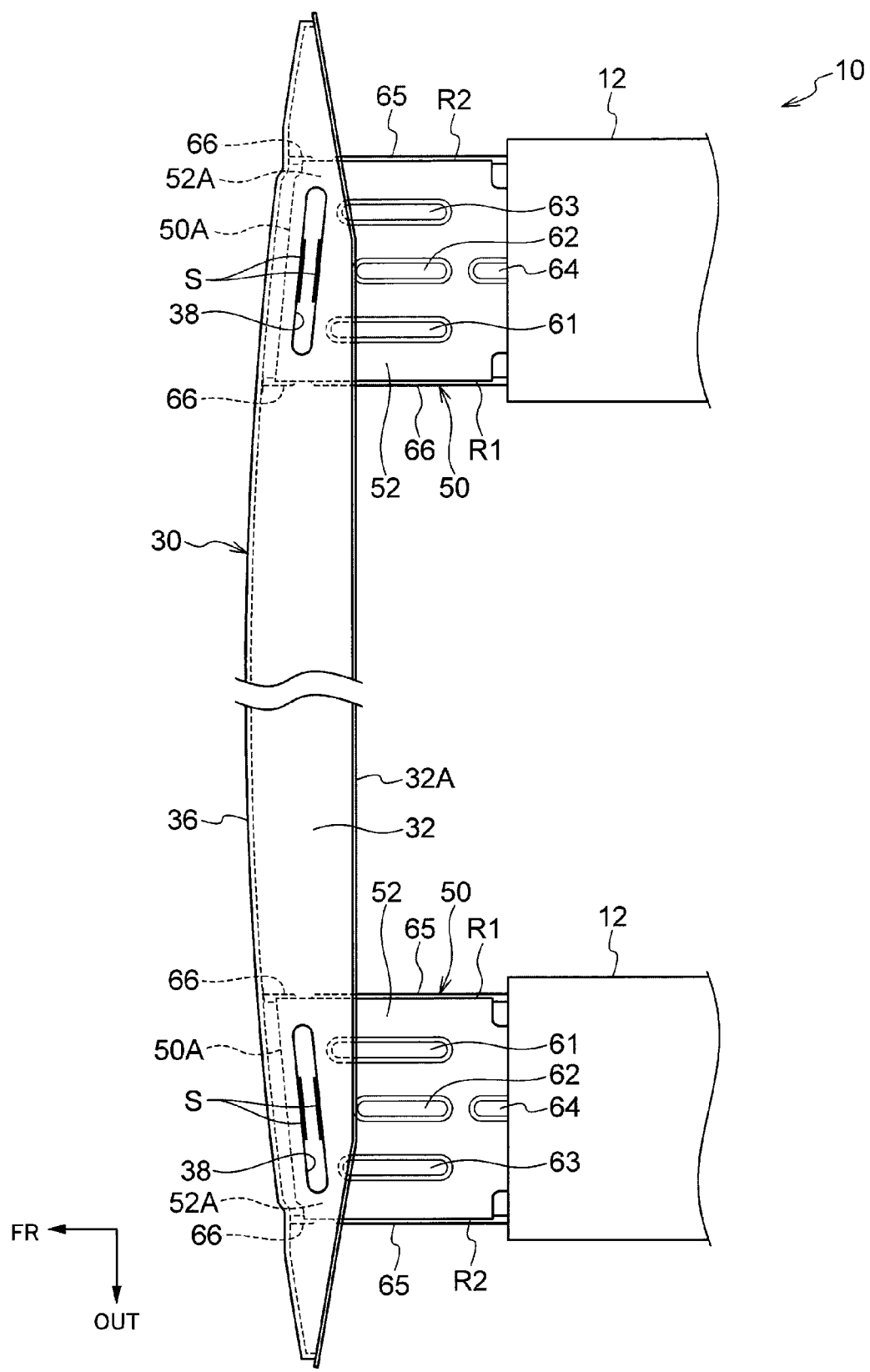
FIG. 1 is a plan view illustrating a vehicle front section applied with a vehicle end section structure according to an exemplary embodiment of the present invention.
Figure 2:
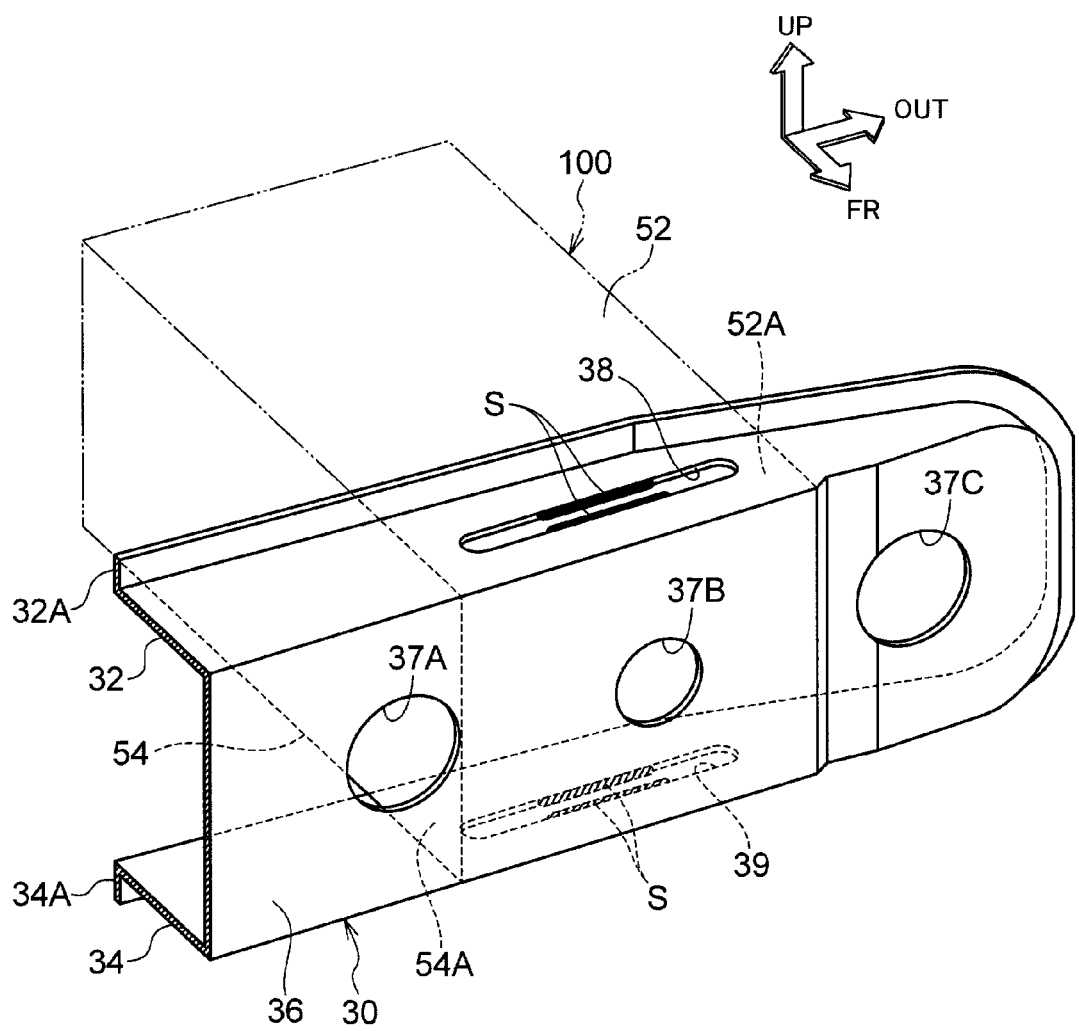
FIG. 2 is a perspective view illustrating a join location (relevant portions) of a crash box of a side member.

As illustrated in FIG. 1 and FIG. 2, the front end section of a vehicle 10 includes elongated bumper reinforcement (front bumper reinforcement) 30 disposed with its length direction in the vehicle width direction. The bumper reinforcement 30 is a high strength member, and a bumper cover, not illustrated in the drawings, is attached to a front face side of the bumper reinforcement 30. Elongated side members (front side members) 12 that are high strength members are disposed with their length direction along the vehicle front-rear direction at lower portions on both sides in the vehicle width direction of the vehicle 10.

Front end portions of each of the side members 12 are disposed at positions (offset positions) separated from the bumper reinforcement 30 by a specific distance to the rear side in the vehicle front-rear direction. Metal crash boxes 50 are provided between the respective front end portions of the side members 12 and the bumper reinforcement 30. The crash boxes 50 are attached to the front end portions of the side members 12, and to the bumper reinforcement 30, using nuts and bolts or the like, not illustrated in the drawings.

Crash Box

Next, explanation follows regarding the crash boxes 50. Note that although the crash boxes 50 are provided on both sides in the vehicle width direction, as illustrated in FIG. 1, other than having left-right symmetry to each other they are similar in structure, and so illustration and explanation is provided for one of the crash boxes 50 only. In the following explanation, in orthogonal cross-section of the crash box 50 taken orthogonally to the vehicle front-rear direction (axial direction), a side in the direction toward the center of gravity (axial center) is denoted the "inside", and the side in the opposite direction thereto is denoted the "outside".

Figure 3:
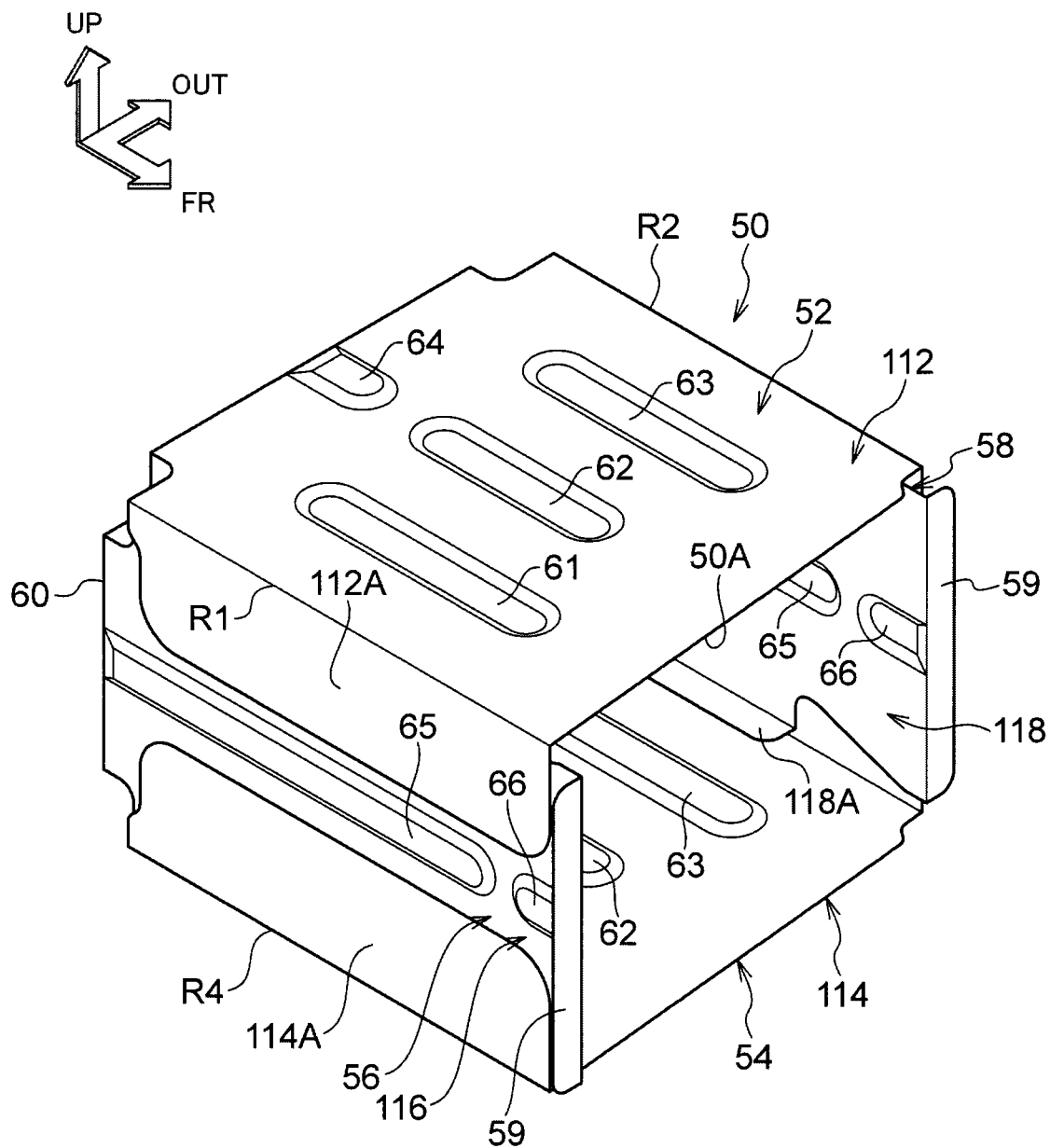
FIG. 3 is a perspective view illustrating a crash box.
Figure 6A:
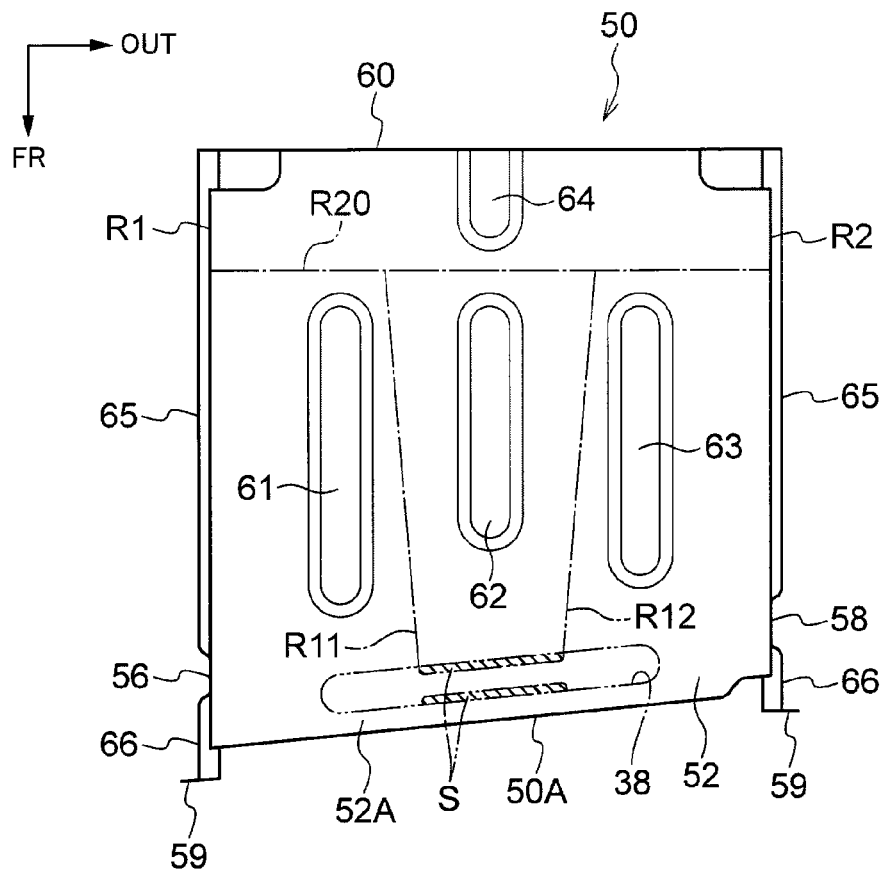
FIG. 6A is an overhead view of the crash box illustrated in FIG. 1.

As illustrated in FIG. 3, each crash box 50 has a substantially square shaped (rectangular shaped) orthogonal cross-section taken orthogonally to the vehicle front-rear direction (axial direction), configuring a box shape open at a front side in the vehicle front-rear direction (see also the vertical cross-section illustrated in FIG. 4 and the views of the six projections illustrated in FIG. 12A to FIG. 12F). As illustrated in FIG. 1 and FIG. 6A, a leading end portion 50A of the crash box 50 is angled slightly toward a vehicle rear side on progression toward the vehicle width direction outside in plan view.

As illustrated in FIG. 3 and FIG. 4, the crash box 50 is configured including an upper face portion 52 and a lower face portion 54 disposed facing each other along the vehicle up-down direction, a side wall portion 56 and a side wall portion 58 disposed facing each other along the vehicle width direction, and a rear face portion 60 provided at the vehicle front-rear direction rear side. As illustrated in FIG. 4, corner portions of the crash box 50 form ridge lines R1, R2, R3, R4 running along the vehicle front-rear direction. As illustrated in FIG. 3, front end portions of side wall portions 56, 58 of the crash box 50 are formed with attachment flanges 59.

As illustrated in FIG. 1, FIG. 3, FIG. 4, and FIG. 6A, the upper face portion 52 and the lower face portion 54 of the crash box 50 are formed with long beads 61, 62, 63 running along the vehicle front-rear direction, at intervals in the vehicle width direction. Short beads 64 running along the vehicle front-rear direction are formed to the upper face portion 52 and the lower face portion 54 at the rear side of the central beads 62. As illustrated in FIG. 3 and FIG. 4, the three long beads 61, 62, 63 that are side-by-side in the vehicle width direction form protrusions toward the inside (axial center side), and as illustrated in FIG. 3, the rear side short beads 64 form protrusions toward the outside.

A bead 65 and a bead 66, running along the vehicle front-rear direction and forming protrusions toward the outside, are aligned along a straight line at a vehicle up-down direction central portion of each of the side wall portions 56, 58 that are disposed facing each other along the vehicle width direction.

As illustrated in FIG. 4, in orthogonal cross-section taken orthogonally to the vehicle front-rear direction, the crash box 50 is configured by an upper side plate portion 112, a lower side plate portion 114, a side plate portion 116, and a side plate portion 118. The orthogonal cross-section of the upper side plate portion 112 is configured in a U-shape (substantially groove shaped), with both vehicle width direction end portions bent toward the lower side to form side portions 112A, thus configuring the upper face portion 52 and upper portions of the side wall portions 56, 58. The orthogonal cross-section of the lower side plate portion 114 is configured in a U-shape (substantially groove shaped), with both vehicle width direction end portions bent toward the upper side to form side portions 114A, thus configuring the lower face portion 54 and lower portions of the side wall portions 56, 58.

The side plate portions 116, 118 are overlapped with the side portions 112A of the upper side plate portion 112 and the side portions 114A of the lower side plate portion 114 from the inside, and joined thereto. Namely, the side wall portions 56, 58 are configured from the side portions 112A of the upper side plate portion 112 and the side portions 114A of the lower side plate portion 114, and the side plate portions 116, 118.

Note that the previously described beads 65, 66 of the side wall portions 56, 58 are formed at the side plate portions 116, 118.

Leading end portions in the up and down direction of the side plate portions 116, 118 are bent toward the inside to form respective flange portions 116A, 118A. The respective flange portions 116A, 118A are disposed running along the vicinity of inside faces of the upper face portion 52 and the lower face portion 54 configured by the upper side plate portion 112 and the lower side plate portion 114. Folded edges of the respective flange portions 116A, 118A form ridge lines R5, R6, R7, R8 running along the vehicle front-rear direction.

Accordingly, although the crash box 50 of the present exemplary embodiment has a substantially square shaped external profile in orthogonal cross-section taken orthogonally to the vehicle front-rear direction, the crash box 50 is configured with the four ridge lines R5, R6, R7, R8 formed by the flange portions 116A, 118A of the side plate portions 116, 118 in addition to the four ridge lines R1, R2, R3, R4 formed at the respective corner portions. Namely, the crash box 50 of the present exemplary embodiment has a structure including a total of eight ridge lines running along the vehicle front-rear direction.

Crash Box Manufacturing Method

Figure 5A:
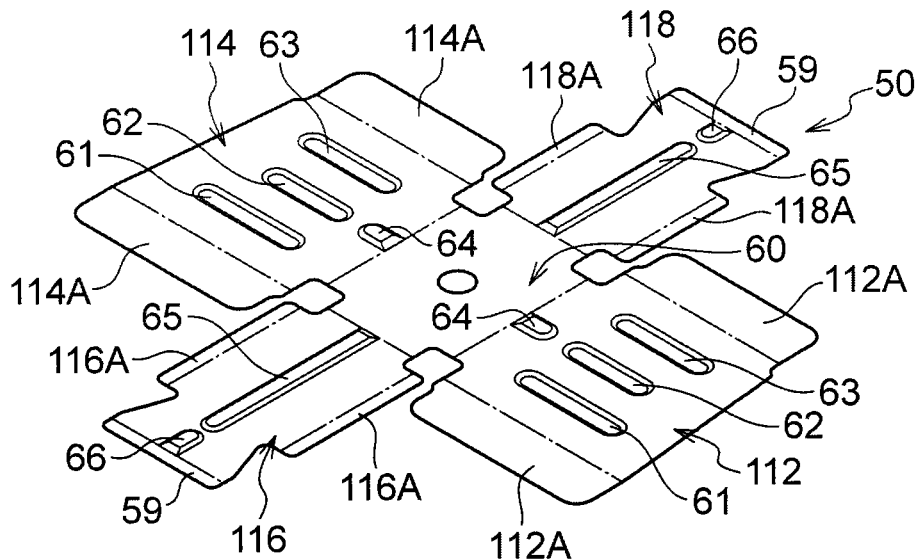
FIG. 5A is a perspective view illustrating a state in which the crash box illustrated in FIG. 1 is laid out flat.
Figure 5B:
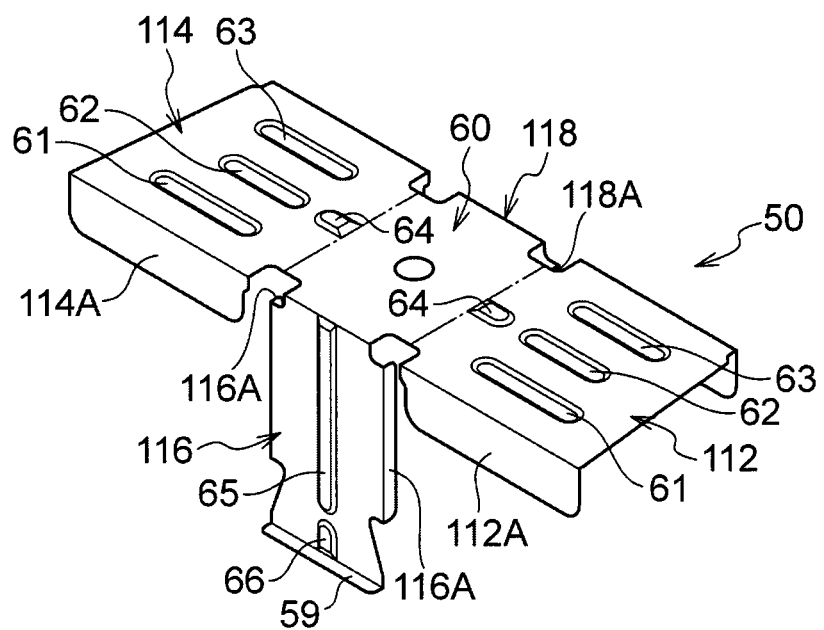
FIG. 5B is a perspective view illustrating a state in which side plate portions of the single sheet of metal that is in a laid out flat state in FIG. 5A have been folded.
Figure 5C:
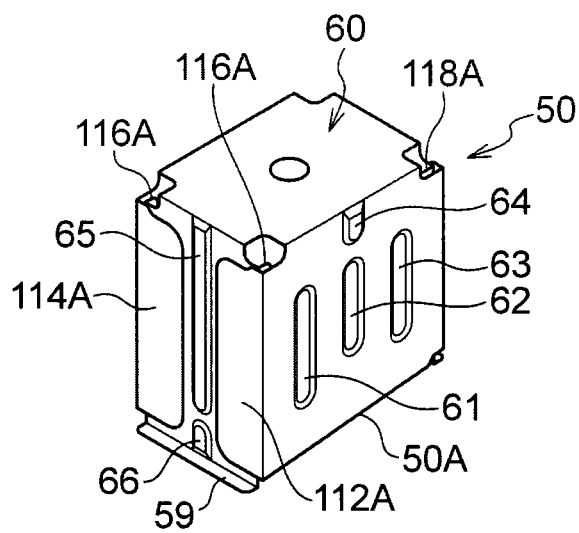
FIG. 5C is a perspective view illustrating a state in which the single sheet of metal that is in a laid out flat state in FIG. 5A has been manufactured by folding and spot welding together.

Next, explanation follows regarding a manufacturing method of the crash box 50, with reference to FIG. 5A to FIG. 5C. Note that the up-down direction in FIG. 5A to FIG. 5C corresponds to the axial direction of the crash box 50 (the vehicle front-rear direction in an assembled state to the vehicle 10), with the rear face portion 60 illustrated at the upper side.

As illustrated in FIG. 5A, when laid out flat, the crash box 50 has a substantially cross shape in plan view, with the upper side plate portion 112, the lower side plate portion 114, and the side plate portions 116, 118 extending out from the rear face portion 60 at the center.

As illustrated in FIG. 5A to FIG. 5C, a single sheet of metal is folded along fold lines (illustrated by single-dotted intermittent lines in FIG. 5A and FIG. 5B). The box shaped crash box 50 is then manufactured by spot welding together the side portions 112A of the upper side plate portion 112 and the side portions 114A of the lower side plate portion 114 together with the side plate portions 116, 118. Note that the folded locations form the ridge lines R1 to R8.

Bumper Reinforcement

Next, explanation follows regarding the bumper reinforcement 30.

Figure 7A:
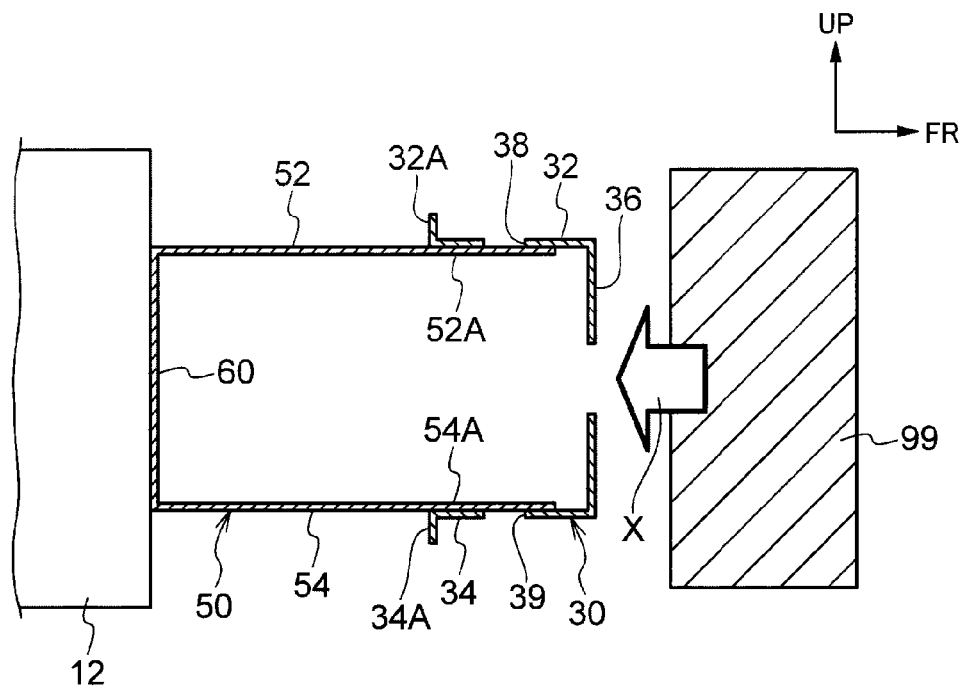
FIG. 7A is a vertical cross-section taken along the vehicle front-rear direction, schematically illustrating a vertical cross-section of the vehicle front section illustrated in FIG. 1 immediately before a frontal vehicle collision.

As illustrated in FIG. 2 and FIG. 7A, in cross-section taken along the vehicle front-rear direction, the bumper reinforcement 30 has a cross-sectional hat profile with an open side on the vehicle rear side.

Specifically, an upper side extension portion 32 and a lower side extension portion 34 respectively extend out toward the vehicle rear side from upper and lower end portions of a front face portion 36 that is disposed with the vehicle front-rear direction as the out-plane direction. A flange portion 32A is formed bent toward the upper side at a rear end portion of the upper side extension portion 32 of the bumper reinforcement 30, and a flange portion 34A is formed bent in a direction toward the lower side at a rear end portion of the lower side extension portion 34.

Elongated welding holes 38, with length direction in the vehicle width direction, are formed at the upper side extension portion 32 of the bumper reinforcement 30, and elongated welding holes 39 each with length direction in the vehicle width direction are formed at the lower side extension portion 34. As illustrated in FIG. 2, the front face portion 36 is formed with assembly holes 37A, 37B, 37C used during assembly of the crash box 50 to the bumper reinforcement 30.

Join Location of Bumper Reinforcement and Crash Box

Next, explanation follows regarding a join location between the bumper reinforcement 30 and the crash box 50.

As illustrated in FIG. 2 and FIG. 7A, a vehicle front side end portion of the crash box 50 is inserted (into an opening) between the upper side extension portion 32 and the lower side extension portion 34 of the bumper reinforcement 30. Using the elongated welding holes 38, 39, the upper side extension portion 32 and the lower side extension portion 34 of the bumper reinforcement 30 are respectively joined by arc welding to a front end portion 52A of the upper face portion 52, and a front end portion 54A of the lower face portion 54 of the crash box 50 (see also FIG. 1 and FIG. 6A).

As illustrated in FIG. 2, the elongated welding holes 38, 39 are shorter than the width of the front end portion 52A of the upper face portion 52 and the front end portion 54A of the lower face portion 54 of the crash box 50 in the vehicle width direction (see also FIG. 6A). The portions indicated by S in FIG. 2 are locations of the arc welded joins using the elongated welding holes 38, 39 (referred to hereafter as the "join portions S").

Figure 9A:
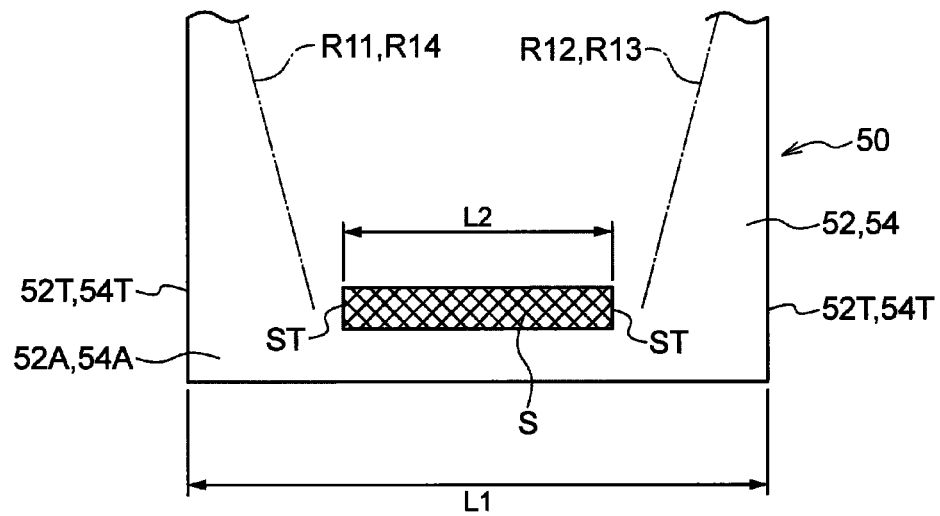
FIG. 9A is an explanatory drawing to explain a relationship between a joint width in the vehicle width direction of respective join portions between an upper side extension portion and a lower side extension portion of bumper reinforcement, and an end portion of an upper face portion and an end portion of a lower face portion of a crash box, and the width in the vehicle width direction of the upper face portion and the lower face portion of the crash box.

As illustrated in the explanatory drawing of FIG. 9A, a joint width L2 of each join portion S in the vehicle width direction is narrower than a vehicle width direction width L1 of the front end portion 52A of the upper face portion 52 and the front end portion 54A of the lower face portion 54 of the crash box 50 (see also FIG. 1 and FIG. 6A). To explain this from a different perspective, non-joined portions are provided at locations between vehicle width direction end portions ST of the join portions S, and vehicle width direction end portions 52T, 54T of the upper face portion 52 and the lower face portion 54.

Operation and Advantageous Effects

Next, explanation follows regarding operation and advantageous effects of the present exemplary embodiment.

Figure 7B:
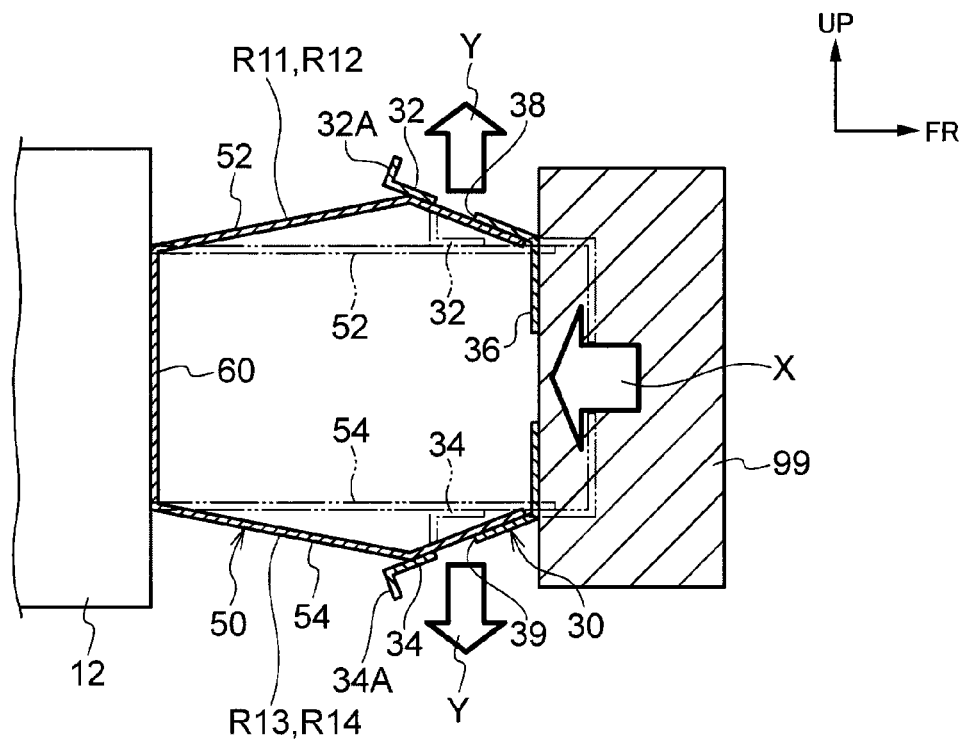
FIG. 7B is a vertical cross-section taken along the vehicle front-rear direction, schematically illustrating a vertical cross-section of the vehicle front section illustrated in FIG. 1 immediately after a frontal vehicle collision.

As illustrated in FIG. 1, the crash boxes 50 are assembled between the bumper reinforcement 30 and the front end portions of the side members 12. As illustrated in FIG. 7A and FIG. 7B, collision load is input to the bumper reinforcement 30 in the event of a frontal vehicle collision of the vehicle 10 with a colliding body 99 (or in the event of a frontal vehicle collision of the colliding body 99 with the vehicle 10). The input collision load is transmitted through the crash boxes 50 to the side members 12. When this occurs, the crash boxes 50 are compressed along the vehicle front-rear direction (axial direction) and deform in a concertina shape, which is to say they are crushed, thereby absorbing energy.

Note that as illustrated in FIG. 7B, during crushing of the crash box 50, the upper side extension portion 32 and the lower side extension portion 34 of the bumper reinforcement 30 open out in the up-down direction (spread apart toward the top and bottom). Due to the upper side extension portion 32 and the lower side extension portion 34 of the bumper reinforcement 30 opening out in the up-down direction, the front end portion 52A of the upper face portion 52 and the front end portion 54A of the lower face portion 54 of the crash box 50 that are respectively joined to the upper side extension portion 32 and the lower side extension portion 34 also open out in the up-down direction together with the upper side extension portion 32 and the lower side extension portion 34, as illustrated by the arrows Y.

The upper side extension portion 32 and the lower side extension portion 34 of the bumper reinforcement 30 accordingly absorb energy effectively, due to opening out in the up-down direction (deforming) as illustrated by the arrows Y as a unit together with the front end portion 52A of the upper face portion 52 and the front end portion 54A of the lower face portion 54 of the crash box 50.

Note that as illustrated in FIG. 1, FIG. 2, FIG. 6A, and FIG. 9A, a joint width in the vehicle width direction (see L2 in FIG. 9A) of the join portions S of the upper side extension portion 32 and the lower side extension portion 34 of the bumper reinforcement 30 is narrower than the respective widths (see L1 in FIG. 9A) of the front end portion 52A of the upper face portion 52, and the front end portion 54A of the lower face portion 54 of the crash box 50.

Figure 8:
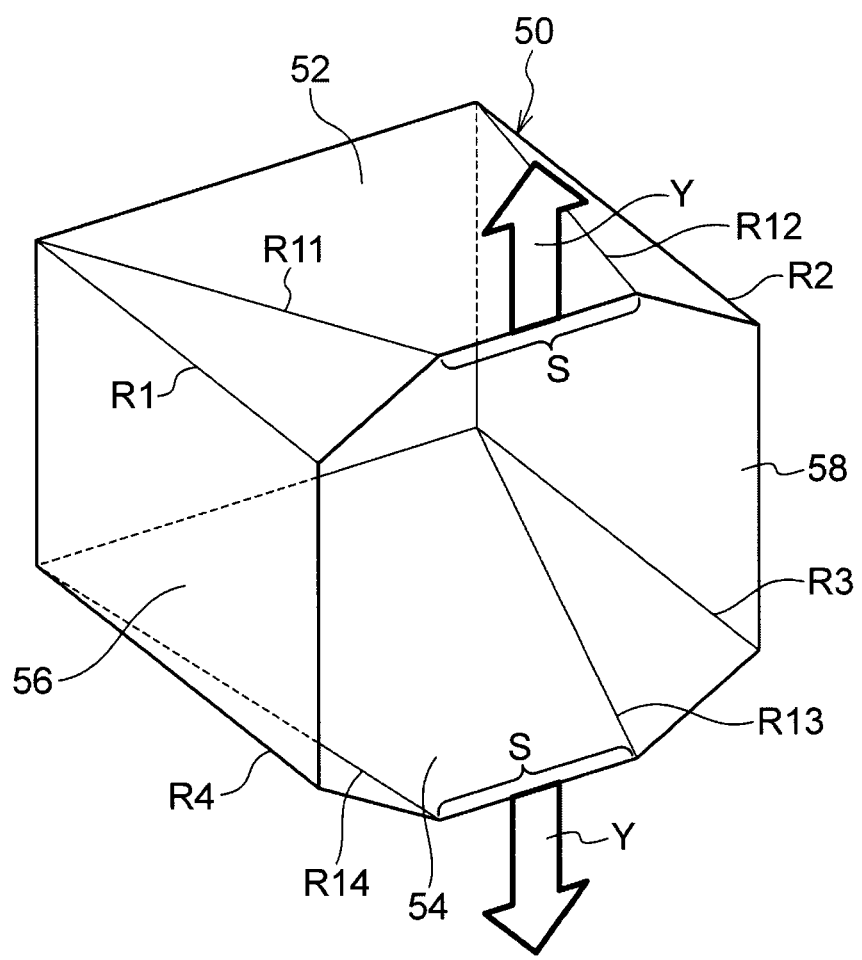
FIG. 8 is a perspective view schematically illustrating a deformed state of the crash box immediately after the frontal vehicle collision illustrated in FIG. 7B.

Accordingly, when the upper face portion 52 and the lower face portion 54 of the crash box 50 open out in the up-down direction in a frontal vehicle collision of the vehicle 10, as illustrated by the double-dotted intermittent lines (phantom lines) in FIG. 4 and schematically illustrated in FIG. 8, only the join portions S open out toward the top and bottom together with the upper side extension portion 32 and the lower side extension portion 34 of the bumper reinforcement 30.

The orthogonal cross-sections of the upper face portion 52 and the lower face portion 54 of the crash box 50, taken orthogonally to the vehicle front-rear direction (axial direction), accordingly deform into substantially trapezoidal shapes with an upper base and a lower base respectively formed by the join portions S. Namely, the orthogonal cross-section of the crash box 50 deforms into a substantially hexagonal shape. Due to this deformation of the orthogonal cross-section, new ridge lines R11, R12, R13, and R14 are newly formed in the upper face portion 52 and the lower face portion 54. The new ridge lines R11, R12, R13, and R14 run from the vicinity of both end portions in the vehicle width direction of vehicle rear end portions to the vicinity of both end portions in the vehicle width direction of the respective join portions S.

Accordingly, as illustrated in FIG. 4, the crash box 50 is newly formed with the four new ridge lines R11, R12, R13, R14 accompanying the deformation of the crash box 50, in addition to the total of eight ridge lines of the four corner portion ridge lines R1, R2, R3, R4, and the four ridge lines R5, R6, R7, R8 formed by the flange portions 116A, 118A. Namely, prior to a frontal vehicle collision (prior to crash box deformation) the crash box 50 has a structure with eight ridge lines, becoming a structure with a total of twelve ridge lines after a frontal vehicle collision (after crash box deformation).

The strength of the crash box 50 in the vehicle front-rear direction increases due to the increased number of ridge lines in the vehicle front-rear direction (axial direction). Load generated during crushing of the crash box 50 in the vehicle front-rear direction therefore increases, as a result of which the energy absorption amount of the crash box 50 increases. Namely, the impact absorption performance of the crash box 50 is improved.

Note that although, strictly speaking, the new ridge lines R11, R12, R13, R14 are slightly angled toward the vehicle width direction with respect to the vehicle front-rear direction in plan view, the new ridge lines R11, R12, R13, R14 fall within the scope of vehicle front-rear direction ridge lines.

As illustrated in FIG. 4, in the side wall portions 56, 58 of the crash box 50, the side plate portions 116, 118 are overlapped with and joined to the side portions 112A of the upper side plate portion 112 and the side portions 114A of the lower side plate portion 114 from the inside, thereby increasing the rigidity of the side wall portions 56, 58. The side wall portions 56, 58 are therefore not susceptible to out-plane deformation, and the upper face portion 52 and the lower face portion 54 of the crash box 50 open out relatively readily in the up-down direction. The new ridge lines R11 to R14 accordingly form more readily at the upper face portion 52 and the lower face portion 54 of the crash box 50.

The crash box 50 is also formed with the beads 61, 62, 63, 64, and 65 running along the vehicle front-rear direction. This accordingly increases the strength of the crash box 50 in the vehicle front-rear direction, thereby increasing the energy absorption amount of the crash box 50.

The beads 61, 62, 63 running along the vehicle front-rear direction of the upper face portion 52 and the lower face portion 54 of the crash box 50 are formed at intervals in the vehicle width direction. During crushing of the crash box 50 in the vehicle front-rear direction, the new ridge lines R11 to R14 form definitively at locations between the bead 61 and the bead 62, and between the bead 62 and the bead 63, where the rigidity is lower than at the high rigidity beads 61, 62, 63. In plan view, the beads 61, 62, 63 are formed so as not to intersect with the anticipated formation location of the new ridge lines R11 to R14.

Figure 6B:
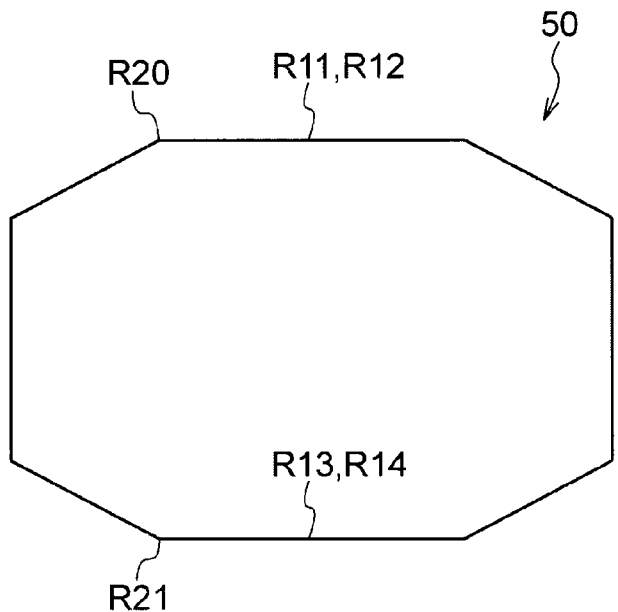
FIG. 6B is a side view of the crash box illustrated in FIG. 6A as viewed along the vehicle width direction, schematically illustrating a state in which an end portion of an upper face portion and an end portion of a lower face portion of the crash box illustrated in FIG. 6A have opened out in the up-down direction immediately after a frontal vehicle collision.

Note that in the present exemplary embodiment, as illustrated in FIG. 1, FIG. 3, and FIG. 6A, the short beads 64 are formed at the upper face portion 52 and the lower face portion 54 of the crash box 50 at the rear side of the central long beads 62. Thus, to be strictly accurate, in the crash box 50 of the present exemplary embodiment a fold R20 is formed running along the vehicle width direction between the long beads 61, 62, 63 at the front side, and the short bead 64 at the rear side, as illustrated in FIG. 6A and FIG. 6B. The fold R20 configures rear end portions of the new ridge lines R11 and R12 formed between the beads 61, 62, 63.

As illustrated in FIG. 4, the flange portions 116A, 118A respectively running along the vicinity of the upper face portion 52 and the lower face portion 54 of the crash box 50 suppress displacement of the upper face portion 52 and the lower face portion 54 toward the inside (displacement in an out-of-plane direction). Collapse of the ridge lines R1 to R4 at the corner portions of the crash box 50 is accordingly prevented or suppressed, such that the crash box 50 is crushed along the vehicle front-rear direction (axial direction) in a more desirable manner. Load is borne stably by the new ridge lines R11 to R14 due to the crash box 50 being crushed along the vehicle front-rear direction in a more desirable manner.

Welding is employed to join the upper side extension portion 32 and the lower side extension portion 34 of the bumper reinforcement 30 to the front end portion 52A of the upper face portion 52 and the front end portion 54A of the lower face portion 54 of the crash box 50. The number of components is accordingly reduced in comparison to other configurations that use a joining method other than welding, such as joining by fastening with nuts and bolts.

As illustrated in FIG. 5A to FIG. 5C, the shape of the crash box 50 of the present exemplary embodiment when laid out flat is a single sheet of metal with a cross shape centered on the rear face portion 60. The box shaped crash box 50 is manufactured by folding and spot welding the single sheet of metal together. The number of components is accordingly reduced in comparison to a configuration in which the crash box 50 is manufactured by joining together plural components.

Modified Examples

Next, explanation follows regarding modified examples of the present exemplary embodiment.

Modified Example of the Join Portions S

In the present exemplary embodiment, arc welding is used to join the upper side extension portion 32 and the lower side extension portion 34 of the bumper reinforcement 30 to the front end portion 52A of the upper face portion 52 and the front end portion 54A of the lower face portion 54 of the crash box 50; however there is no limitation thereto. Joining may be performed using a welding method other than arc welding, for example, spot welding. Alternatively, a method other than welding, for example fastening with nuts and bolts, may be employed.

Figure 9B:
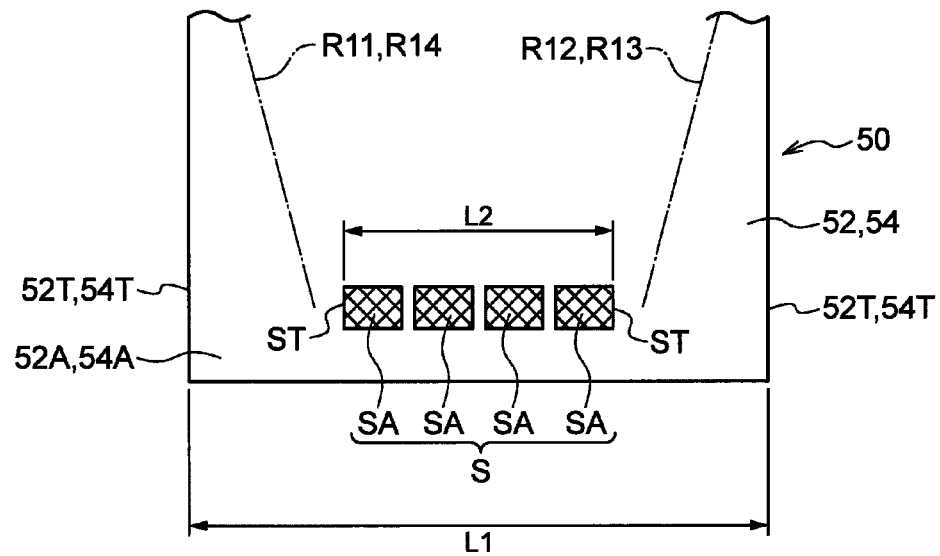
FIG. 9B is an explanatory drawing corresponding to FIG. 9A, to explain a relationship between a joint width in the vehicle width direction of another example of a join portion, and the width in the vehicle width direction of the upper face portion and the lower face portion of the crash box.

In the present exemplary embodiment, as illustrated in FIG. 9A, each join portion S extends continuously in the vehicle width direction; however there is no limitation thereto. For example, as illustrated in FIG. 9B, plural join portions SA may be configured in a row, with separations between each other. Note that in such a configuration, the width across the join portions SA at both vehicle width direction ends is the joint width L2 of the join portion S. Namely, in order to form the new ridge lines R11 to R14, it is sufficient that the joint width of the join portions S in the vehicle width direction is narrower than the width in the vehicle width direction of the front end portion 52A of the upper face portion 52 and the front end portion 54A of the lower face portion 54 of the crash box 50. To explain this from a different perspective, it is sufficient that non-joined portions are formed between the vehicle width direction end portions ST of the join portions S, and the respective vehicle width direction end portions 52T, 54T of the upper face portion 52 and the lower face portion 54.

Modified Example of the Bumper Reinforcement 30

As illustrated in FIG. 2 and FIG. 7A, in the present exemplary embodiment, the flange portion 32A is formed bent toward the upper side from a rear end portion of the upper side extension portion 32 of the bumper reinforcement 30, and the flange portion 34A is formed bent toward the lower side from a rear end portion of the lower side extension portion 34 of the bumper reinforcement 30. In other words, the cross-section of the bumper reinforcement 30 taken along the vehicle front-rear direction has a cross-section hat shape with an open side on the vehicle rear side. However, there is no limitation to such a shape. For example, the upper side extension portion 32 and the lower side extension portion 34 may have a lateral U-shaped cross-section that is not formed with the flange portions 32A, 34A. Namely, it is sufficient that the bumper reinforcement 30 is formed with the upper side extension portion 32 and the lower side extension portion 34 that are joined to the upper face portion 52 and the lower face portion 54 of the crash box 50.

Modified Example of the Crash Box

In the present exemplary embodiment, the flange portions 116A, 118A of the crash box 50 are configured in the vicinity of the inside faces of the upper face portion 52 and the lower face portion 54 as illustrated in FIG. 4; however there is no limitation thereto. The flange portions 116A, 118A may contact the inside faces of the upper face portion 52 and the lower face portion 54.

In the present exemplary embodiment, the side plate portions 116, 118 are overlapped with and joined to the insides of the side portions 112A of the upper side plate portion 112 and the side portions 114A of the lower side plate portion 114 of the crash box 50; however there is no limitation thereto. The side plate portions 116, 118 may be overlapped with and joined to the outsides of the side portions 112A of the upper side plate portion 112 and the side portions 114A of the lower side plate portion 114. Note that in such a configuration, the flange portions 116A, 118A are either in the vicinity of, or in contact with, outside faces of the upper face portion 52 and the lower face portion 54.

Figure 10:
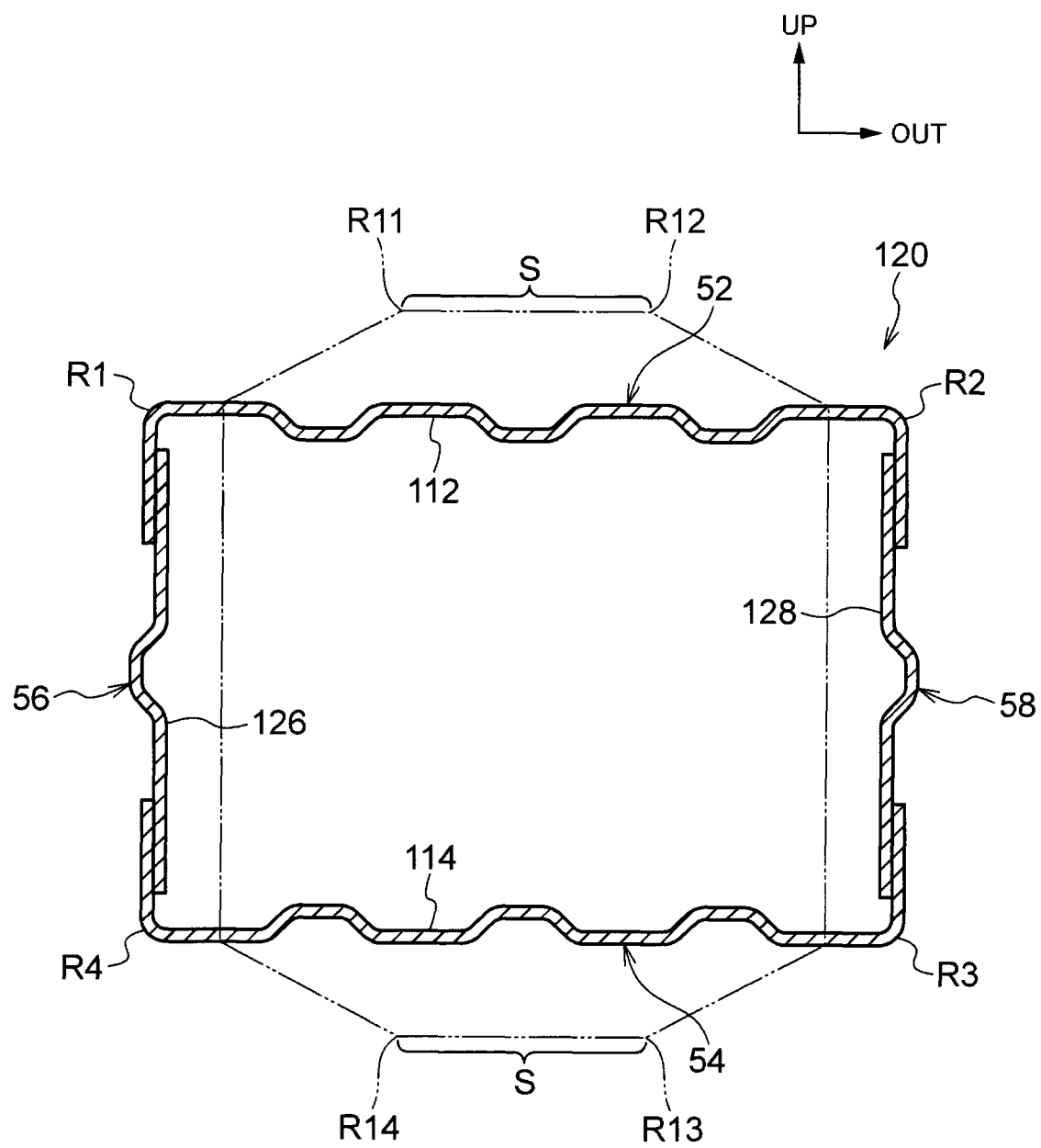
FIG. 10 is a vertical cross-section corresponding to FIG. 2, illustrating a crash box in which a side plate portion is not formed with flange portions.

As illustrated in FIG. 10, a crash box 120 may be configured without forming the flange portions 116A, 118A (see FIG. 4). Specifically, the crash box 120 may be configured such that side plate portions 126, 128, which are not formed with the flange portions 116A, 118A (see FIG. 4), are overlapped with and joined to the side portions 112A of the upper side plate portion 112 and the side portions 114A of the lower side plate portion 114. Note that in FIG. 10, the side plate portions 126, 128 are overlapped with and joined to the insides of the side portions 112A, 114A; however, they may be overlapped with and joined to the outsides of the side portions 112A, 114A.

In the present exemplary embodiment, as illustrated in FIG. 5A to 5C, the shape of the crash box 50 when laid out flat is a single sheet of metal with a cross shape centered on the rear face portion 60, which is folded and spot welded together to manufacture the box shaped crash box 50. However, there is no limitation thereto.

Figure 11:
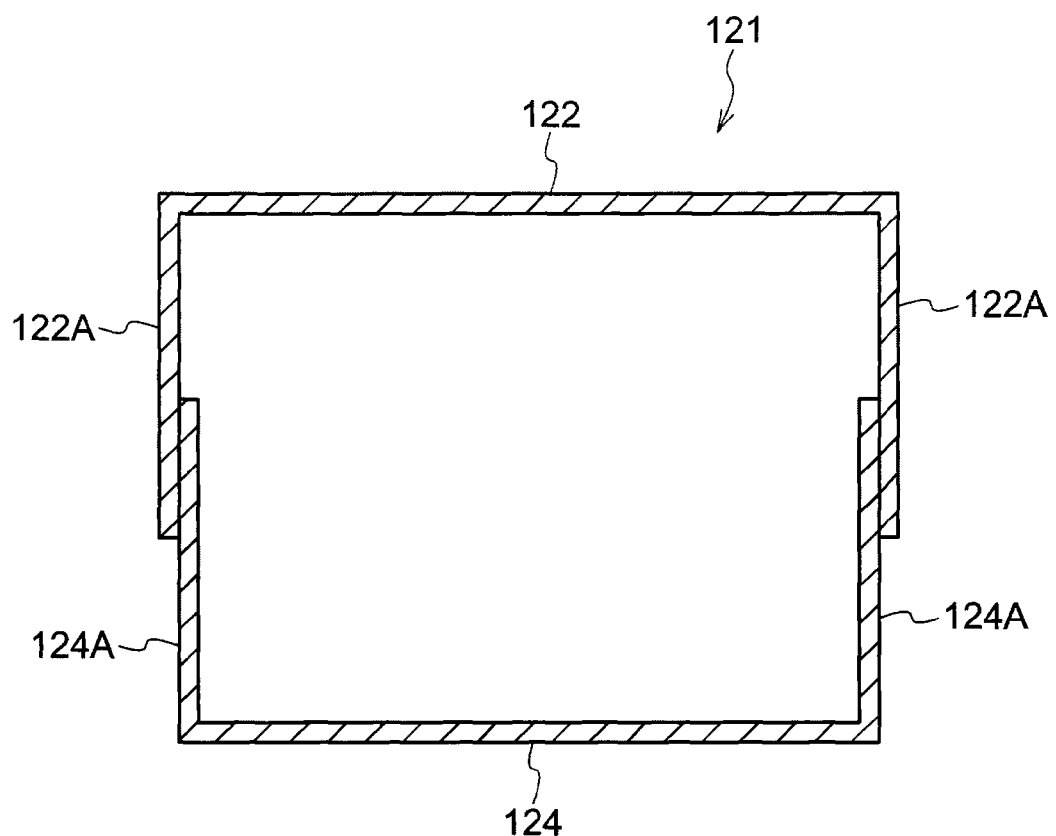
FIG. 11 is a vertical cross-section corresponding to FIG. 2, illustrating a crash box including two plate members.
Figure 12A:
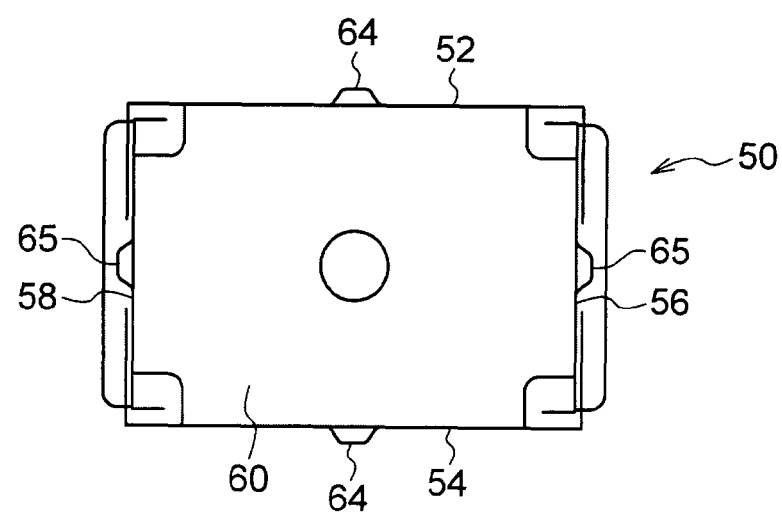
FIG. 12A is a back face view of a crash box.
Figure 12B:
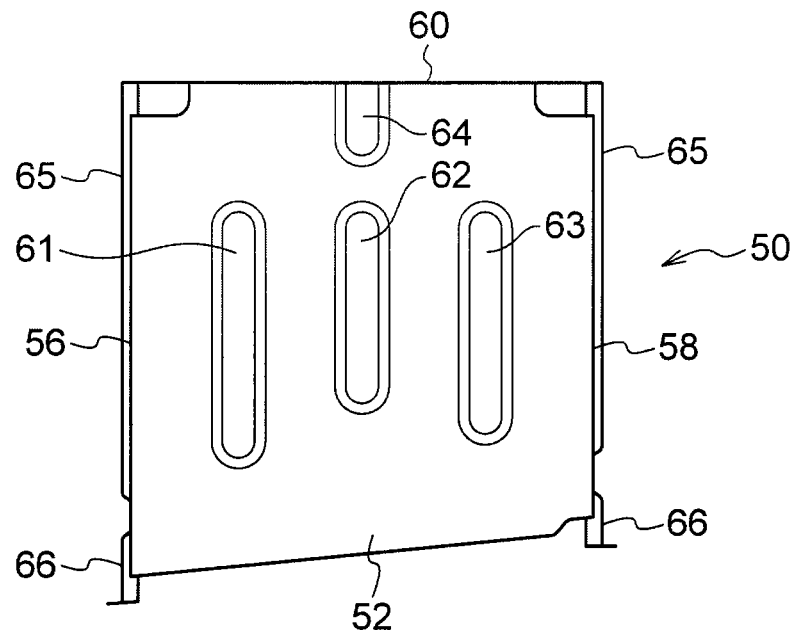
FIG. 12B is a plan view of a crash box.
Figure 12C:
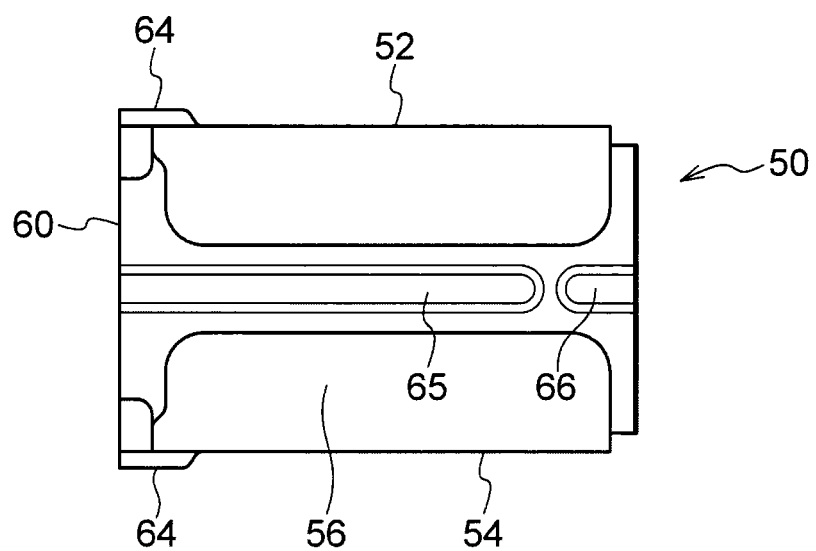
FIG. 12C is a side view of a crash box from the left.
Figure 12D:
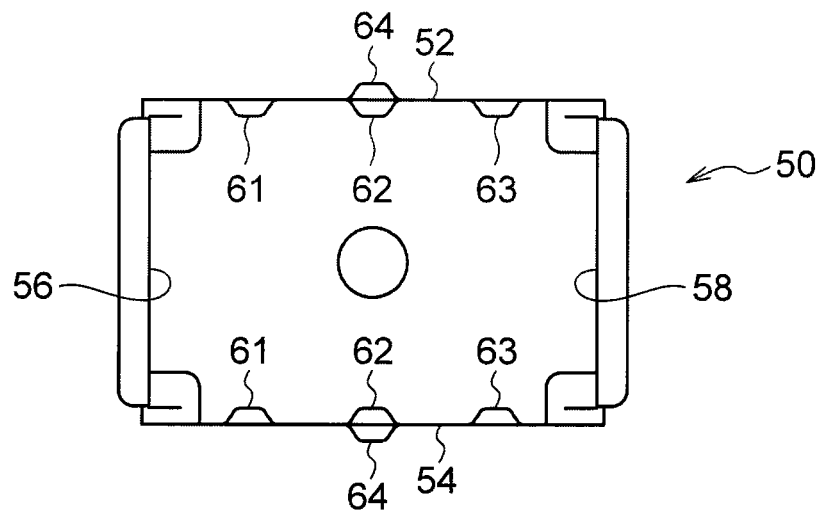
FIG. 12D is a front view of a crash box.
Figure 12E:
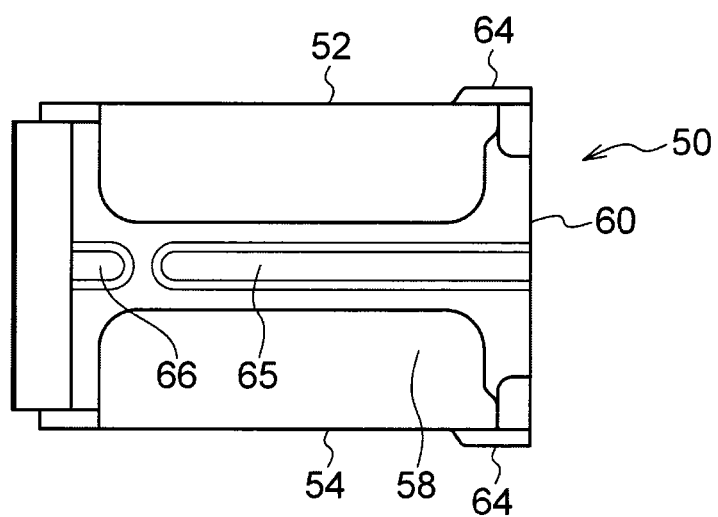
FIG. 12E is a side view of a crash box from the right.
Figure 12F:
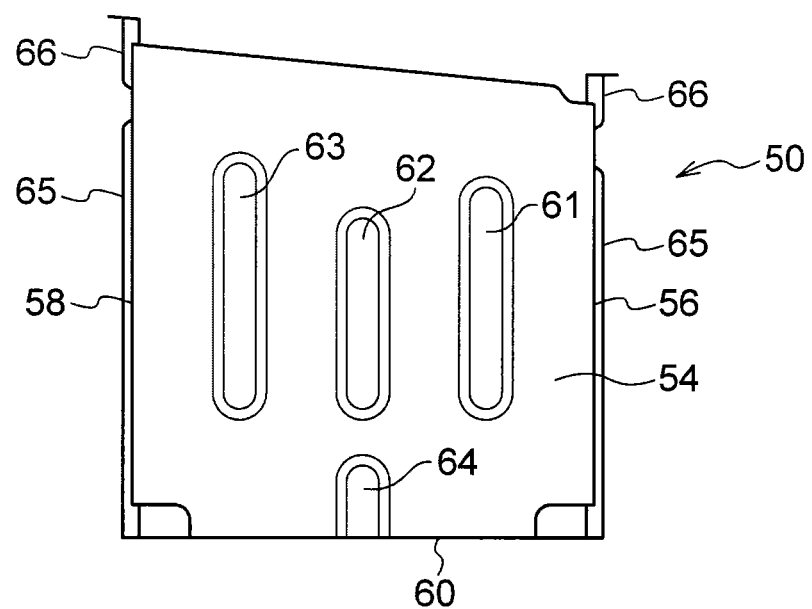
FIG. 12F is view of a crash box from underneath.

For example, as in a crash box 121 illustrated in FIG. 11, configuration may be made in which two plate members of a U-shaped upper side plate portion 122 including side portions 122A formed by bending both vehicle width direction end portions toward the lower side, and a U-shaped lower face portion 124 including side portions 124A formed by bending both vehicle width direction end portions toward the upper side, are disposed facing each other from top to bottom, and the side portions 122A and the side portions 124A are overlapped with each other and joined together.

In the present exemplary embodiment, as illustrated in FIG. 3 and FIG. 4, the crash box 50, 120, 121 is configured with a substantially square shaped (rectangular shaped) orthogonal cross-section taken orthogonally to the vehicle front-rear direction (axial direction), and has a box shape open at the vehicle front-rear direction front side; however there is no limitation thereto. For example, configuration may be made with a cross-section profile in which side wall portions are bent toward the outside or the inside.

In the present exemplary embodiment, the crash boxes 50, 120, 121 serving as an example of an impact absorbing member are provided between the bumper reinforcement (front bumper reinforcement) 30 of the vehicle front section, and the side members (front side members) 12 serving as an example of a framework member; however there is no limitation thereto. The crash boxes may be provided between rear bumper reinforcement and rear side members of a vehicle rear end section.

Note that the present invention is not limited to the above exemplary embodiment.

For example, the upper face portion 52 and the lower face portion 54 of the crash box 50 are formed with the beads 61, 62, 63; however there is no limitation thereto. One or two beads may be formed, or there may be four or more. The beads may also be omitted.

Obviously, various configurations may be implemented within a range not departing from the spirit of the present invention.

The invention claimed is:

1. A vehicle end section structure comprising:
   a bumper reinforcement disposed running along a vehicle width direction at an end section in a front-rear direction of a vehicle;
   framework members disposed running along the vehicle front-rear direction at lower portions on both sides in the vehicle width direction;
   an impact absorbing member that is provided between the bumper reinforcement and each framework member, and that is crushed in the vehicle front-rear direction by collision load input from the bumper reinforcement;
   an upper side extension portion that extends from an upper portion of the bumper reinforcement toward a side of the impact absorbing member, and that is joined to an end portion of an upper face portion of the impact absorbing member over a joint width narrower than a width of the end portion in the vehicle width direction of the upper face portion of the impact absorbing member; and
   a lower side extension portion that extends from a lower portion of the bumper reinforcement toward the side of the impact absorbing member, and that is joined to an end portion of a lower face portion of the impact absorbing member over a joint width narrower than a width of the end portion in the vehicle width direction of the lower face portion of the impact absorbing member,
   wherein an external profile of the impact absorbing member, in an orthogonal cross-section taken orthogonally to the vehicle front-rear direction, is a substantially rectangular shape, and at least a portion of respective side wall portions provided between the upper face portion and the lower face portion is configured by overlapping and joining together a plurality of plate members, and
   wherein, in the orthogonal cross-section, the impact absorbing member comprises
   an upper side plate portion configuring upper portions of the side wall portions, and configuring the upper face portion;
   a lower side plate portion configuring lower portions of the side wall portions, and configuring the lower face portion;
   side plate portions, each of which overlaps from either an inside or an outside with either one of the upper portions of the side wall portions and either one of the lower portions of the side wall portions respectively configured by the upper side plate portion and the lower side plate portion, the side plate portions configuring the side wall portions together with the upper side plate portion and the lower side plate portion; and
   flange portions that are formed by bending respective leading end portions on the upper face portion side and the lower face portion side of each of the side plate portion or the lower face portion.

2. The vehicle end section structure of claim 1, wherein:
   the end portion of the upper face portion of the impact absorbing member and the end portion of the lower face portion of the impact absorbing member are respectively joined by welding to the upper side extension portion and the lower side extension portion of the bumper reinforcement.

3. The vehicle end section structure of claim 1, wherein:
   a single bead, or two or more beads, are formed at the upper face portion and the lower face portion of the impact absorbing member, so as to run along the vehicle front-rear direction.

* * * * *